(12) United States Patent
Weerawarna et al.

(10) Patent No.: US 7,300,965 B2
(45) Date of Patent: Nov. 27, 2007

(54) MIXED POLYMER NETWORK

(75) Inventors: S. Ananda Weerawarna, Seattle, WA (US); Carole W. Herriott, Bremerton, WA (US); Richard A. Jewell, Tacoma, WA (US); Mengkui Luo, Tacoma, WA (US); Amar N. Neogi, Kenmore, WA (US)

(73) Assignee: Weyerhaeuser Company, Federal Way, WA (US)

( * ) Notice: Subject to any disclaimer, the term of this patent is extended or adjusted under 35 U.S.C. 154(b) by 347 days.

(21) Appl. No.: 11/026,305

(22) Filed: Dec. 29, 2004

(65) Prior Publication Data

US 2006/0142479 A1 Jun. 29, 2006

(51) Int. Cl.
*C08L 1/00* (2006.01)

(52) U.S. Cl. ............... 524/37; 524/51; 524/53; 524/501

(58) Field of Classification Search .......... 524/37, 524/51, 53, 501
See application file for complete search history.

(56) References Cited

U.S. PATENT DOCUMENTS

| | | |
|---|---|---|
| 2,811,519 A | 10/1957 | Touey |
| 3,574,818 A | 4/1971 | Takehara et al. |
| 3,638,698 A | 2/1972 | Woodman et al. |
| 3,900,463 A | 8/1975 | Yada et al. |
| 3,936,441 A | 2/1976 | Holst et al. |
| 3,965,091 A | 6/1976 | Holst et al. |
| 4,043,921 A * | 8/1977 | Hessert et al. ............ 507/113 |
| 4,063,018 A | 12/1977 | Ohnaka et al. |
| 4,066,828 A | 1/1978 | Holst et al. |
| 4,068,067 A | 1/1978 | Holst et al. |
| 4,110,230 A * | 8/1978 | Hessert et al. ............ 507/213 |
| 4,389,513 A | 6/1983 | Miyazaki |
| 4,418,524 A | 12/1983 | Ito et al. |
| 4,507,474 A | 3/1985 | Raehse et al. |
| 4,547,570 A | 10/1985 | Garner |
| 4,613,631 A * | 9/1986 | Espenscheid et al. ....... 523/130 |
| 4,615,923 A | 10/1986 | Marx |
| 4,650,716 A | 3/1987 | Gelman |
| 4,650,863 A | 3/1987 | Felcht et al. |
| 4,689,408 A | 8/1987 | Gelman |
| 4,734,478 A | 3/1988 | Tsubakimoto et al. |
| 4,771,105 A | 9/1988 | Shirai et al. |
| 4,783,510 A | 11/1988 | Saotome |
| 4,972,007 A | 11/1990 | Herzog et al. |
| 5,026,596 A | 6/1991 | Saotome |
| 5,221,722 A | 6/1993 | Sehm |
| 5,247,072 A | 9/1993 | Ning et al. |
| 5,308,896 A * | 5/1994 | Hansen et al. ............ 524/13 |
| 5,324,823 A | 6/1994 | Asakawa et al. |
| 5,470,964 A | 11/1995 | Qin |
| 5,498,705 A | 3/1996 | Oin |
| 5,532,221 A | 7/1996 | Huang et al. |
| 5,550,189 A | 8/1996 | Qin et al. |
| 5,561,114 A | 10/1996 | Komai et al. |
| 5,668,273 A | 9/1997 | Allen et al. |
| 5,734,025 A | 3/1998 | Komai et al. |
| 5,792,856 A | 8/1998 | Allen et al. |
| 5,800,418 A | 9/1998 | Ahr |
| 5,817,713 A | 10/1998 | Pappas et al. |
| 5,998,511 A | 12/1999 | Westland et al. |
| 6,015,936 A | 1/2000 | Takai et al. |
| 6,020,536 A | 2/2000 | Österdahl et al. |
| 6,063,982 A | 5/2000 | Martin et al. |
| 6,083,211 A | 7/2000 | DesMarais |
| 6,107,356 A | 8/2000 | DesMarais |
| 6,107,538 A | 8/2000 | Young et al. |
| 6,121,409 A | 9/2000 | Mitchell et al. |
| 6,135,987 A | 10/2000 | Tsai et al. |
| H1909 H | 11/2000 | Ahr |
| 6,184,271 B1 | 2/2001 | Westland et al. |
| 6,270,845 B1 | 8/2001 | Pappas et al. |
| 6,271,278 B1 | 8/2001 | Park et al. |
| 6,303,544 B1 | 10/2001 | Maas et al. |
| 6,500,947 B1 | 12/2002 | West et al. |
| 6,593,468 B1 | 7/2003 | Lange et al. |
| 6,602,994 B1 | 8/2003 | Cash et al. |
| 6,635,755 B1 * | 10/2003 | Jaschinski et al. ............ 536/56 |
| 6,656,974 B1 | 12/2003 | Renn et al. |
| 6,686,464 B1 | 2/2004 | Harding et al. |
| 6,765,042 B1 | 7/2004 | Thornton et al. |
| 6,824,645 B2 * | 11/2004 | Jaschinski et al. ............ 162/9 |
| 2003/0027787 A1 | 2/2003 | Couture et al. |

FOREIGN PATENT DOCUMENTS

CA 2072978 A1 8/1993

(Continued)

OTHER PUBLICATIONS

Anbergen, U. and W. Oppermann, "Elasticity and Swelling Behaviour of Chemically Crosslinked Cellulose Ethers in Aqueous Systems," *Polymer 31*:1854-1858, Oct. 1990.

Gong, J.P., et al., "Double-Network Hydrogels With Extremely High Mechanical Strength," *Adv. Mater. 15*(14): 1155-1158, Jul. 17, 2003.

Pradad, M.P., and M. Kalyanasundaram, "Effect of Incorporation of Gelatin, an Interactive Polymer on the Matrix Stability and Release of Fenthion From Crosslinked Matrices of Carboxymethylcellulose," *Journal of Controlled Release 27*:219-225, 1993.

(Continued)

*Primary Examiner*—James J. Seidleck
*Assistant Examiner*—Olga Asinovsky
(74) *Attorney, Agent, or Firm*—Christensen O'Connor Johnson Kindess

(57) ABSTRACT

A mixed polymer network made from reacting a carboxyalkyl cellulose and a synthetic water-soluble polymer with a crosslinking agent.

19 Claims, 4 Drawing Sheets

FOREIGN PATENT DOCUMENTS

| | | |
|---|---|---|
| EP | 0 566 118 B2 | 10/1993 |
| EP | 0 796 070 B1 | 9/1997 |
| WO | WO 95/11925 A1 | 5/1995 |
| WO | WO 96/15137 A1 | 5/1996 |
| WO | WO 99/20318 A2 | 4/1999 |
| WO | WO 00/27886 A1 | 5/2000 |
| WO | WO 00/47628 A2 | 8/2000 |

OTHER PUBLICATIONS

Prasad, M.P., and M. Kalyanasundaram, "Scanning Electron Microscopic Analysis and Swelling Behaviour of Ionotropically Crosslinked Carboxymethylcellulose and Carboxymethylcellulose-Gelatin Matrices," *Carbohydrate Polymers* 26:35-41, 1995.

Barbucci R et al., Swelling behavior of carboxymethylcellulose hydrogels in relation to cross-inking, pH and charge density, *Macromol* 33: 7475-7480 (2000).

Heinze et al., "Studies on the synethsus and characterization fo carboxymethylcellulose," *Die Ang Makro Chem 266*: 37-45 (1999).

Kalman et al., "Effect of the reaction condition on the degree of substitution on carboxymethyl cellulose," *Colloid Polym Sci 266*: 716-720 (1999).

Klemm et al., Etherization of Cellulose, "*Comprehensive Cellulose Cehmistry, Vol. 2: Functionalization of Cellulose,*" and Appendix, p. 353, Wiley-VCH (2001).

Zhang et al, "Solvent effect on carboxymethylation of cellulose," *J Appl Poly Sci 49*: 741-746 (1993).

\* cited by examiner

MIXED POLYMER NETWORK

FIELD OF THE INVENTION

The present invention relates to a mixed polymer network made from reacting a carboxyalkyl cellulose and a synthetic water-soluble polymer with a crosslinking agent.

BACKGROUND OF THE INVENTION

Personal care absorbent products, such as infant diapers, adult incontinent pads, and feminine care products, typically contain an absorbent core that includes superabsorbent polymer particles distributed within a fibrous matrix. Superabsorbents are water-swellable, generally water-insoluble absorbent materials having a high absorbent capacity for body fluids. Superabsorbent polymers (SAPs) in common use are mostly derived from acrylic acid, which is itself derived from oil, a non-renewable raw material. Acrylic acid polymers and SAPs are generally recognized as not being biodegradable. Despite their wide use, some segments of the absorbent products market are concerned about the use of non-renewable oil derived materials and their non-biodegradable nature. Acrylic acid based polymers also comprise a meaningful portion of the cost structure of diapers and incontinent pads. Users of SAP are interested in lower cost SAPs. The high cost derives in part from the cost structure for the manufacture of acrylic acid which, in turn, depends upon the fluctuating price of oil. Also, when diapers are discarded after use they normally contain considerably less than their maximum or theoretical content of body fluids. In other words, in terms of their fluid holding capacity, they are "over-designed". This "over-design" constitutes an inefficiency in the use of SAP. The inefficiency results in part from the fact that SAPs are designed to have high gel strength (as demonstrated by high absorbency under load or AUL). The high gel strength (upon swelling) of currently used SAP particles helps them to retain a lot of void space between particles, which is helpful for rapid fluid uptake. However, this high "void volume" simultaneously results in there being a lot of interstitial (between particle) liquid in the product in the saturated state. When there is a lot of interstitial liquid the "rewet" value or "wet feeling" of an absorbent product is compromised.

In personal care absorbent products, U.S. southern pine fluff pulp is commonly used in conjunction with the SAP. This fluff is recognized worldwide as the preferred fiber for absorbent products. The preference is based on the fluff pulp's advantageous high fiber length (about 2.8 mm) and its relative ease of processing from a wetlaid pulp sheet to an airlaid web. Fluff pulp is also made from renewable and biodegradable cellulose pulp fibers. Compared to SAP, these fibers are inexpensive on a per mass basis, but tend to be more expensive on a per unit of liquid held basis. These fluff pulp fibers mostly absorb within the interstices between fibers. For this reason, a fibrous matrix readily releases acquired liquid on application of pressure. The tendency to release acquired liquid can result in significant skin wetness during use of an absorbent product that includes a core formed exclusively from cellulosic fibers. Such products also tend to leak acquired liquid because liquid is not effectively retained in such a fibrous absorbent core.

A need therefore exists for a superabsorbent composition that is made from a biodegradable renewable resource like cellulose and that is inexpensive. In this way, the superabsorbent composition can be used in absorbent product designs that are efficient such that they can be used closer to their theoretical capacity without feeling wet to the wearer. The present invention seeks to fulfill this need and provides further related advantages.

SUMMARY OF THE INVENTION

The invention provides a mixed polymer network having superabsorbent properties. The composition is obtainable by reacting a carboxyalkyl cellulose and a synthetic water-soluble polymer having carboxylic acid or carboxylic acid derivative substituents with a crosslinking agent. The crosslinking agent reacts with at least one of the carboxyalkyl cellulose or water-soluble polymer to provide the network.

In other aspects, absorbent products that include the polymer network are provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
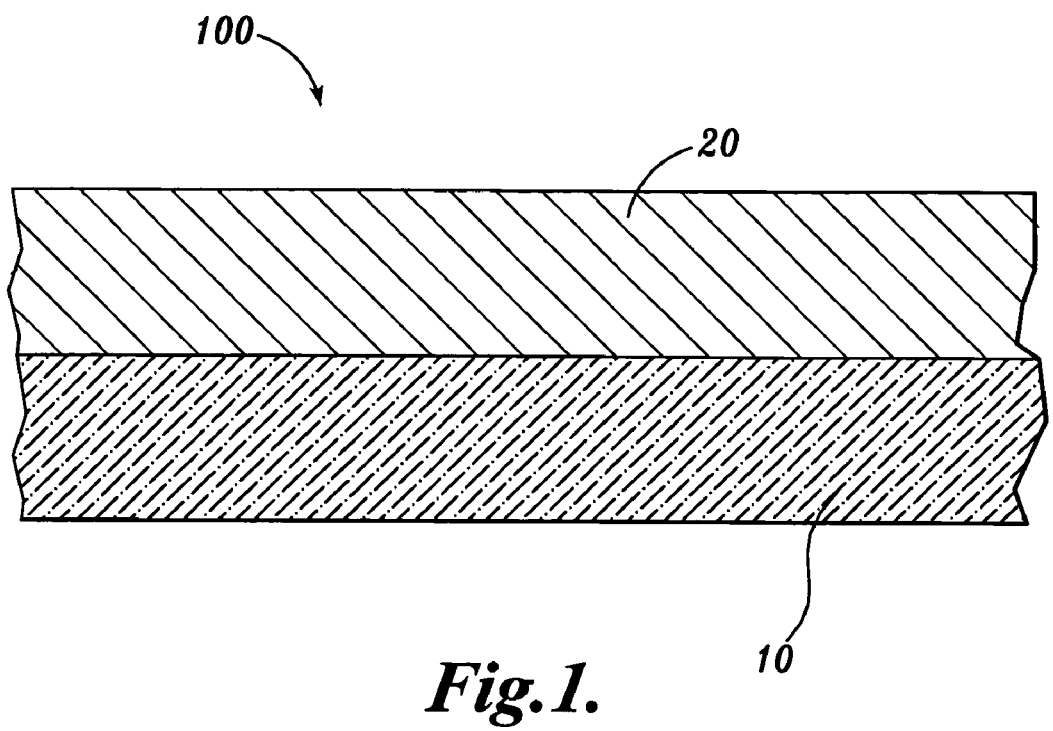
FIG. 1 is a cross sectional view of an absorbent construct incorporating a polymer network of the invention and having an acquisition layer.

In one aspect, the invention provides a polymer network having superabsorbent properties. The network includes two types of polymers. The first polymer is a carboxyalkyl cellulose polymer. The second polymer is a synthetic water-soluble polymer having either carboxylic acid substituents and/or carboxylic acid derivative substituents.

The polymer network (also referred to herein as "the composition") is obtainable by reacting a carboxyalkyl cellulose and a synthetic water-soluble polymer having carboxylic acid or carboxylic acid derivative substituents with a crosslinking agent. In one embodiment, the carboxyalkyl cellulose and synthetic water-soluble polymer are reacted with two crosslinking agents. The crosslinking agent(s) reacts with at least one of the carboxyalkyl cellulose or synthetic water-soluble polymer to provide the network. In one embodiment, the polymer network is obtained by treating a carboxyalkyl cellulose and a synthetic water-soluble polymer with a crosslinking agent to provide a reaction mixture, and crosslinking the reaction mixture to provide the composition. In this embodiment, crosslinking the reaction mixture refers to crosslinking the carboxyalkyl cellulose, crosslinking the synthetic water-soluble polymer, and/or crosslinking the carboxyalkyl cellulose to the synthetic water-soluble polymer to provide the network.

In the network, the ratio of carboxyalkyl cellulose polymer to synthetic water-soluble polymer is from about 50:50 to about 95:5 weight/weight. In one embodiment, the synthetic water-soluble polymer is present in the network in about 10 percent by weight based on the weight of the carboxyalkyl cellulose.

In certain embodiments, the polymer network of the invention includes two or more types of polymers.

In one embodiment, the carboxyalkyl cellulose is a water-soluble carboxyalkyl cellulose. In one embodiment, the carboxyalkyl cellulose is a carboxymethyl cellulose. In one embodiment, the carboxyalkyl cellulose is a carboxyethyl cellulose. Mixtures of carboxymethyl and carboxyethyl celluloses can be used. Suitable carboxyalkyl celluloses include carboxymethyl celluloses commercially available from Hercules, Inc. (Hopewell, Va.) under the designations AQUALON 9H4F and AQUALON 7H4F.

The absorbent properties of polymer networks prepared according to the method of the invention from commercially available carboxymethyl celluloses are summarized in Tables 1 and 5-14. The absorbent properties of polymer networks prepared according to the method of the invention with a single crosslinking agent are summarized in Tables 5-9. The absorbent properties of polymer networks prepared according to the method of the invention with two crosslinking agents are summarized in Tables 10-14.

In one embodiment, the carboxyalkyl cellulose is derived from a fully bleached pulp. It will be appreciated that fully bleached pulp includes celluloses and hemicelluloses. Therefore, products of the invention derived from bleached pulp may include carboxyalkyl hemicelluloses, in addition to carboxyalkyl celluloses.

In another embodiment, the carboxyalkyl cellulose is derived from unbleached or lightly bleached pulp. It will be appreciated that unbleached or lightly bleached pulp includes celluloses, hemicelluloses, and lignins. Therefore, products of the invention derived from unbleached or lightly bleached pulps may include carboxyalkyl hemicelluloses and carboxyalkyl lignins, in addition to carboxyalkyl celluloses.

As used herein, the term "carboxyalkyl cellulose" refers to carboxyalkyl celluloses derived from any source; for carboxyalkyl celluloses derived from bleached pulp, the term "carboxyalkyl cellulose" refers to carboxyalkyl celluloses and carboxyalkyl hemicelluloses; for carboxyalkyl celluloses derived from unbleached or lightly bleached pulp, the term "carboxyalkyl cellulose" refers to carboxyalkyl celluloses, carboxyalkyl hemicelluloses, and carboxyalkyl lignins.

Unbleached or lightly bleached celluloses have a high lignin content, high kappa value, high hemicellulose content, and high degree of polymerization compared to conventional pulps used to make carboxyalkyl celluloses. Unbleached or lightly bleached celluloses are made from pulping processes that do not include a pre-hydrolysis step, have cooking times shorter and cooking temperatures lower that conventional pulping processes, and that do not include extensive bleaching stages. Representative unbleached or lightly bleached celluloses have kappa values of from about 1 to about 65, from about 2 to about 40, or about 35. Kappa value is determined by standard method TAPPI T-236.

The absorbent properties of polymer networks prepared according to the method of the invention from carboxymethyl celluloses derived from unbleached or slightly bleached pulps are summarized in Tables 2 and 3.

As noted above, the synthetic water-soluble polymer is a synthetic polymer having carboxylic acid substituents and/or carboxylic acid derivative substituents. As used herein, the term "synthetic" refers to a polymer that is made by chemical synthesis (e.g., polyacrylic acid or polyacrylamide) and is not a naturally-occurring polymer (e.g., cellulose). The term "carboxylic acid substituent" refers to a free acid substituent having the formula —$CO_2H$; a carboxylate substituent having the formula —$CO_2^-$; or a carboxylate salt substituent having the formula —$CO_2M$, where m is a cationic species such as a metal ion (e.g., sodium or potassium). The term "carboxylic acid derivative substituent" refers to a substituent having the formula —COXR. The carboxylic acid derivative substituent can be an amide (i.e., —$CONH_2$, —$CONHR_1$, or —$CONR^2_2$, where $R^1$ and $R^2$ are alkyl groups). Other suitable carboxylic acid derivative substituents include ester substituents. In one embodiment, the carboxylic acid derivative substituent is an amide.

Representative polymers having carboxylic acid substituents include polyacrylic acid polymers, polymaleic acid polymers, polyaspartic acid polymers, copolymers of acrylic acid and acrylamide, copolymers of acrylic acid and maleic acid, copolymers of maleic acid and itaconic acid, partially-hydrolyzed polyacrylamide polymers, and mixtures thereof. In one embodiment, the water soluble polymer is a polyacrylic acid. Suitable polyacrylic acid polymers include polyacrylic acids having a variety of molecular weights. Exemplary polyacrylic acid polymers have the following molecular weights: 450,000; 750,000; 1,250,000, 3,000,000; and 4,000,000.

Representative polymers having carboxylic acid derivative substituents include polyacrylamide polymers. In one embodiment, the water-soluble polymer is a polyacrylamide. Suitable polyacrylamide polymers include polyacrylamides having a variety of molecular weights. Exemplary polyacrylamide polymers have the following molecular weight ranges: 5,000,000 to 6,000,000, and 11,000,000 to 14,000, 000.

The composition is obtainable by reacting a carboxyalkyl cellulose and a synthetic water-soluble polymer having carboxylic acid or carboxylic acid derivative substituents with a crosslinking agent.

Suitable crosslinking agents include crosslinking agents that are reactive toward carboxylic acid groups. Representative organic crosslinking agents that are reactive toward carboxylic acid groups include diols and polyols, diamines and polyamines, diepoxides and polyepoxides, polyoxazoline functionalized polymers, and aminols having one or more amino groups and one or more hydroxy groups. Representative inorganic crosslinking agents that are reactive toward carboxylic acid groups include polyvalent cations and polycationic polymers. Exemplary inorganic crosslinking agents include aluminum chloride, aluminum sulfate, and ammonium zirconium carbonate with or without carboxylic acid ligands such as succinic acid (dicarboxylic acid), citric acid (tricarboxylic acid), butane tetracarboxylic acid (tetracarboxylic acid). Water soluble salts of trivalent iron and divalent zinc and copper can be used as crosslinking agents. Clay materials such as Kaolinite and Montmorrillonite can also be used for crosslinking polycarboxylated polymers. Titanium alkoxides commercially available from DuPont under the designation TYZOR can be used to form covalent bonds with polymer carboxyl and/or hydroxyl groups.

Mixtures of crosslinking agents can be used.

Representative diol crosslinking agents include 1,4-butanediol and 1,6-hexanediol.

Representative diamine and polyamine crosslinking agents include polyether diamines, such as polyoxypropylenediamine, and polyalkylene polyamines. Suitable polyether diamines and polyether polyamines are commercially available from Huntsman Corp., Houston, Tex., under the designation JEFFAMINE. Representative diamines and polyamines (e.g., tri-, tetra-, and pentaamines) include JEFFAMINE D-230 (molecular weight 230), JEFFAMINE D-400 (molecular weight 400), and JEFFAMINE D-2000 (molecular weight 2000); JEFFAMINE XTJ-510 (D-4000) (molecular weight 4000), JEFFAMINE XTJ-50 (ED-600) (molecular weight 600), JEFFAMINE XTJ-501 (ED-900) (molecular weight 900), and JEFFAMINE XTJ-502 (ED-2003) (molecular weight 2000); JEFFAMINE XTJ-504 (EDR-148) (molecular weight 148); JEFFAMINE HK-511 (molecular weight 225); and ethylenediamine, diethylenetriamine, triethylenetetraamine, and tetraethylenepentaamine.

Representative diepoxide crosslinking agents include vinylcyclohexene dioxide, butadiene dioxide, and diglycidyl ethers such as polyethylene glycol (400) diglycidyl ether and ethylene glycol diglycidyl ether.

Representative polyoxazoline functionalized polymers include EPOCROS WS-500 manufactured by Nippon Shokubai.

Representative aminol crosslinking agents include triethanolamine.

Representative polycationic polymers include polyethylenimine and polyamido epichlorohydrin resins such as KYMENE 557H manufactured by Hercules, Inc.

Suitable crosslinking agents include crosslinking agents that are reactive toward the synthetic water-soluble polymer functional groups and/or the carboxyalkyl cellulose hydroxyl groups. Representative crosslinking agents that are reactive toward the carboxyalkyl cellulose hydroxyl groups include aldehyde, dialdehyde, dialdehyde sodium bisulfite addition product, dihalide, diene, diepoxide, haloepoxide, dicarboxylic acid, and polycarboxylic acid crosslinking agents. Mixtures of crosslinking agents can also be used.

Representative aldehyde crosslinking agents include formaldehyde.

Representative dialdehyde crosslinking agents include glyoxal, glutaraldehyde, and dialdehyde sodium bisulfite addition products.

Representative dihalide crosslinking agents include 1,3-dichloro-2-hydroxypropane.

Representative diene crosslinking agents include divinyl ethers and divinyl sulfone.

Representative diepoxide crosslinking agents include vinylcyclohexene dioxide, butadiene dioxide, and diglycidyl ethers such as polyethylene glycol diglycidyl ether and ethylene glycol diglycidyl ether.

Representative haloepoxide crosslinking agents include epichlorohydrin.

Representative carboxylic acid crosslinking agents including di- and polycarboxylic acids. U.S. Pat. Nos. 5,137,537, 5,183,707, and 5,190,563, describe the use of C2-C9 polycarboxylic acids that contain at least three carboxyl groups (e.g., citric acid and oxydisuccinic acid) as crosslinking agents. Suitable polycarboxylic acid crosslinking agents include citric acid, tartaric acid, malic acid, succinic acid, glutaric acid, citraconic acid, itaconic acid, tartrate monosuccinic acid, maleic acid, 1,2,3-propane tricarboxylic acid, 1,2,3,4-butanetetracarboxylic acid, all-cis-cyclopentane tetracarboxylic acid, tetrahydrofuran tetracarboxylic acid, 1,2,4,5-benzenetetracarboxylic acid, and benzenehexacarboxylic acid.

As noted above, carboxylated polymers may be crosslinking with diamines and polyamines. Depending on the diamine or polyamine, the polymers may be crosslinked through diamide crosslinks or amide/ionic crosslinks. A mixture of a first carboxylated polymer having a plurality of carboxyl groups and a second carboxylated polymer having a plurality of carboxyl groups can be treated with a triazine crosslinking activator (e.g., 2,4,6-trichloro-1,3,5-triazine, also known as cyanuric chloride, and 2-chloro-4,6-dimethoxy-1,3,5-triazine) to provide a mixture of first and second activated carboxylated polymers. In one embodiment, the mixture of activated carboxylated polymers is reacted with a diamine or polyamine having two amino groups (e.g., primary and secondary amino groups) reactive toward activated carboxyl groups of the first and second activated carboxylated polymers to form a plurality of diamide crosslinks to provide a crosslinked carboxylated polymer. In another embodiment, the mixture of activated carboxylated polymers is reacted with a diamine or polyamine having one amino group that is reactive toward the activated carboxyl groups of the first and second activated carboxylated polymers to form a plurality of amide bonds, and a second amino group (e.g., tertiary and quaternary amino groups) that is not covalently reactive toward the activated carboxyl groups of the first and second activated carboxylated polymers and forms a plurality of ionic bonds with carboxyl groups, thereby effectively crosslinking the polymers to provide a crosslinked carboxylated polymer. The term "ionic crosslink" refers to a crosslink that includes an amide bond and an ionic bond or association between an amino group and a carboxyl group. An ionic crosslink is formed by reaction of a first activated carboxyl group with a diamine or polyamine to provide a first amide, the resulting amide having a second amino group that is ionically reactive or associative toward a second carboxyl group.

It will be appreciated that mixtures and/or blends of crosslinking agents can also be used.

Crosslinking catalysts can be used to accelerate the crosslinking reaction. Suitable catalysts include acidic salts, such as ammonium chloride, ammonium sulfate, aluminum chloride, magnesium chloride, and alkali metal salts of phosphorous-containing acids.

The amount of crosslinking agent applied to the polymers can vary depending on the desired absorption characteristics. The amount of crosslinking agent applied to the polymers will depend on the particular crosslinking agent and is suitably in the range of from about 0.01 to about 8.0 percent by weight based on the total weight of the carboxyalkyl cellulose. In one embodiment, the amount of crosslinking agent applied to the polymers is in the range from about 0.50 to about 5.0 percent by weight based on the total weight of the carboxyalkyl cellulose. In one embodiment, the amount of crosslinking agent applied to the polymers is in the range from about 1.0 to about 2.0 percent by weight based on the total weight of the carboxyalkyl cellulose.

The polymer network of the invention has a Free Swell Capacity of at least about 45 g/g. In one embodiment, the network has a Free Swell Capacity of from about 45 g/g to about 120 g/g. Free Swell Capacity was determined by the method described in Example 4.

The polymer network of the invention has a Centrifuge Capacity of at least about 20 g/g. In one embodiment, the network has a Centrifuge Capacity of from about 20 g/g to about 50 g/g. Centrifuge Capacity was determined by the method described in Example 4.

The polymer network of the invention has an Absorbency Under Load (AUL) value of at least about 10 g/g. In one embodiment, the network has an Absorbency Under Load value of from about 10 g/g to about 40 g/g. Absorbency Under Load value was determined by the method described in Example 5.

In another aspect of the invention, a method for making a polymer network having superabsorbent properties is provided. In the method, a carboxyalkyl cellulose and a synthetic water-soluble polymer having carboxylic acid or carboxylic acid derivative substituents are reacted with a crosslinking agent. The crosslinking agent reacts with at least one of the carboxyalkyl cellulose or synthetic water-soluble polymer In one embodiment, the method comprises treating a carboxyalkyl cellulose and a synthetic water-soluble polymer with a crosslinking agent to provide a reaction mixture, and crosslinking the reaction mixture to provide the composition.

In another embodiment, the method comprises combining a water-soluble carboxyalkyl cellulose, a synthetic water-soluble polymer, and a crosslinking agent in an aqueous solution to provide a reaction solution; precipitating the reaction mixture by addition of a water-miscible solvent to provide a precipitated mixture; collecting the precipitated mixture; and crosslinking the precipitated mixture to provide the polymer network.

In embodiments using certain metal ions as the crosslinking agent, combining a solution of a carboxyalkyl cellulose with the metal ion (e.g., aluminum sulfate) results in precipitation of a crosslinked product at or near room temperature (i.e., about 25° C.).

In other embodiments, crosslinking can be achieved by heating at a temperature and for a period of time sufficient to effect crosslinking. Crosslinking can be achieved by heating at a temperature of about 50 to 150° C. for about 5 to 60 minutes. Crosslinking can occur during precipitation of the polymer mixture or during drying of the precipitated mixture.

In one embodiment, the method further includes combining the carboxyalkyl cellulose, the synthetic water-soluble polymer, and the crosslinking agent with a second crosslinking agent. The second crosslinking agent is different from the crosslinking agent initially combined with the carboxyalkyl cellulose and the synthetic water-soluble polymer.

Thus, in another aspect, the invention provides a polymer network obtainable from the reaction of a carboxyalkyl cellulose and a synthetic water-soluble polymer having carboxylic acid or carboxylic acid derivative substituents with two crosslinking agents, in which each crosslinking agent reacts with at least one of the carboxyalkyl cellulose or water-soluble polymer.

The second crosslinking agent can be any one of those described above including aldehyde, dialdehyde, dihalide, diene, diepoxide, haloepoxide, dicarboxylic acid, polycarboxylic acid, diol, diamine, aminol, inorganic cationic compound, and polycationic polymer crosslinking agents.

The second crosslinking agent is added in an amount from about 2 to about 20 mole percent based on the amount of the water-soluble polymer. In one embodiment, the second crosslinking agent is added in an amount from about 4 to about 16 mole percent based on the amount of the water-soluble polymer. In one embodiment, the second crosslinking agent is added in an amount from about 6 to about 10 mole percent based on the amount of the water-soluble polymer.

In one embodiment, the first crosslinking agent is 1,4-butanediol and the second crosslinking agent is formaldehyde.

In one embodiment, the first crosslinking agent is 1,4-butanediol and the second crosslinking agent is ethylene glycol diglycidyl ether.

In one embodiment, the first crosslinking agent is 1,4-butanediol and the second crosslinking agent is polyethylene glycol diglycidyl ether.

In one embodiment, the first crosslinking agent is ethylene glycol diglycidyl ether and the second crosslinking agent is formaldehyde.

In one embodiment, the first crosslinking agent is triethanolamine and the second crosslinking agent is formaldehyde.

In one embodiment, the first crosslinking agent is divinyl sulfone and the second crosslinking agent is 1,6-hexanediol.

In one embodiment, the first crosslinking agent is ethylene glycol diglycidyl ether and the second crosslinking agent is glutaraldehyde.

In one embodiment, the first crosslinking agent is triethanolamine and the second crosslinking agent is glutaraldehyde.

A method for making carboxymethyl cellulose is described in Example 1. Methods for making representative polymer networks of the invention are described in Examples 2 and 3. Example 3 describes a method for making a representative fibrous polymer network of the invention.

The properties of polymer networks of the invention are summarized in the following tables.

Table 1 summarizes the absorbent properties of polymer networks prepared by reacting a commercially available carboxymethyl cellulose (AQUALON CMC 9H4F, Hercules Corp., Hopewell, Va.) and polyacrylic acid (10 percent by weight based on the total weight of components) with glutaraldehyde (percent by weight based on total weight of components), and recovering the polymer network by evaporation to a film.

TABLE 1

Absorbent Properties of Representative Polymer Networks: Polyacrylic Acid and Commercially Available Carboxymethyl Cellulose.

| Percent Crosslinker | Free Swell (g/g) | Centrifuge Capacity (g/g) | AUL (g/g) |
|---|---|---|---|
| 2.2 | 70.0 | 48.3 | 23.6 |
| 4.3 | 74.7 | 43.2 | 22.3 |
| 6.3 | 60.5 | 45.0 | 22.5 |

Table 2 summarizes the absorbent properties of polymer networks prepared by reacting a carboxymethyl cellulose (CMC) derived from lightly bleached pulp (see kappa values) and polyacrylic acid (4 million, 10 percent by weight based on the total weight of components) with glutaraldehyde (4.3 percent by weight based on the total weight of components), and recovering the polymer network by evaporation to a film.

TABLE 2

Absorbent Properties of Representative Polymer Networks: Polyacrylic Acid and Carboxymethyl Cellulose from Lightly Bleached Pulp.

| CMC Pulp (kappa) | Free Swell (g/g) | Centrifuge Capacity (g/g) | AUL (g/g) |
|---|---|---|---|
| A (2.4) | 70.1 | 51.6 | 23.4 |
| B (4.7) | 65.6 | 38.9 | 22.2 |
| C (5.0) | 64.5 | 49.3 | 24.5 |
| D (18.4) | 82.2 | 43.3 | 20.0 |
| E (20.6) | 77.1 | 52.9 | 21.6 |
| F (20.9) | 75.3 | 56.8 | 21.0 |
| G (19.9) | 74.8 | 42.6 | 20.2 |
| H (17.9) | 73.3 | 48.2 | 20.5 |
| I (17.4) | 70.8 | 49.3 | 22.1 |
| J (16.9) | 80.3 | 38.8 | 21.9 |
| K (13.6) | 77.2 | 57.7 | 24.6 |

TABLE 2-continued

Absorbent Properties of Representative Polymer Networks: Polyacrylic Acid and Carboxymethyl Cellulose from Lightly Bleached Pulp.

| CMC Pulp (kappa) | Free Swell (g/g) | Centrifuge Capacity (g/g) | AUL (g/g) |
|---|---|---|---|
| L (16.3) | 80.4 | 28.7 | 20.5 |
| M (23.4) | 65.6 | 47.6 | 23.1 |
| N (1.5) | 81.1 | 33.0 | 21.8 |
| O (3.5) | 78.8 | 46.4 | 21.7 |

Table 3 summarizes the absorbent properties of polymer networks prepared by reacting a carboxymethyl cellulose (CMC) derived from lightly bleached pulp (kappa values are the same as indicated above for pulps A, C, E, and F) and polyacrylamide (molecular weight 5-6 million, 10 percent by weight based on the CMC) with glutaraldehyde (8 mole percent based on the equivalent acrylamide monomer content of polyacrylamide). The polymer networks were recovered by precipitation in acetone.

TABLE 3

Absorbent Properties of Representative Polymer Networks: Polyacrylamide and Carboxymethyl Cellulose from Lightly Bleached Pulp.

| CMC Pulp | Heat Treatment | Free Swell (g/g) | Centrifuge Capacity (g/g) | AUL (g/g) |
|---|---|---|---|---|
| A | — | 95.4 | 27.4 | 22.5 |
| A | 150° C./15 min | 52.0 | 27.9 | 28.3 |
| C | — | 113.5 | 32.2 | 24.4 |
| C | 150° C./15 min | 66.2 | 35.8 | 29.3 |
| E | — | 79.9 | 32.0 | 26.7 |
| E | 150° C./15 min | 57.1 | 33.6 | 27.5 |
| F | — | 89.3 | 31.0 | 24.0 |
| F | 150° C./15 min | 50.4 | 25.1 | 27.7 |

Reference values for Free Swell and Centrifuge Capacities and Absorbency Under Load for a commercially available carboxymethyl cellulose (CMC 9H4F, Hercules Corp., Hopewell, Va.) and a polyacrylamide (molecular weight 5-6 million, PAAm 1; or 11-14 million, PAAm 2, commercially available from JRM Chemical under the designation SOIL-MOIST) or a polyacrylic acid (molecular weight 4 million, PAA 1; molecular weight 3 million, PAA 2; molecular weight 1.25 million, PAA 3; molecular weight 750,000, PAA 4; molecular weight 450,000, PAA 5) are summarized in Table 4. Weight percent of XL-1 is based on CMC weight. The polymer networks were recovered by precipitation in acetone except for the fifth through eighth samples, which were recovered by evaporation to a film.

TABLE 4

Absorbent Properties of Representative Polymer Networks: Carboxylmethyl Cellulose and Polyacrylamide Reference Values.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 9H4F | — | — | — | 0 | 0 | 23.2 | 13.3 | 30.2 |
| 9H4F | — | — | — | 15 | 150 | 29.8 | 18.8 | 34.5 |
| 9H4F | — | — | — | 30 | 150 | 34.2 | 23.2 | 32.5 |
| — | PAAm 1 | — | — | — | — | 19.1 | 6.2 | — |
| — | PAAm 1 | — | — | — | — | 23.4 | 11.0 | — |
| 9H4F | PAAm 1 | — | — | 0 | — | 30.0 | 18.1 | 19.8 |
| 9H4F | PAAm 1 | — | — | 15 | 150 | 36.0 | 22.1 | 20.8 |

TABLE 4-continued

Absorbent Properties of Representative Polymer Networks: Carboxylmethyl Cellulose and Polyacrylamide Reference Values.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 9H4F | PAAm 1 | — | — | 30 | 150 | 41.9 | 24.9 | 24.6 |
| 9H4F | PAAm 2 | — | — | 0 | — | 26.0 | 14.6 | 20.3 |
| 9H4F | PAAm 2 | — | — | 15 | 150 | 71.5 | 48.6 | 25.5 |
| 9H4F | PAAm 2 | — | — | 30 | 150 | 52.5 | 25.6 | 30.6 |
| 9H4F | PAA 1 | — | — | 0 | — | 100.8 | 86.7 | — |
| 9H4F | PAA 1 | — | — | 15 | 50 | 37.9 | 28.2 | — |
| 9H4F | PAA 1 | — | — | 30 | 50 | 44.2 | 30.6 | — |
| 9H4F | PAA 1 | — | — | 15 | 100 | 50.1 | 30.6 | — |
| 9H4F | PAA 1 | — | — | 30 | 100 | 54.3 | 30.1 | 20.9 |
| 9H4F | PAA 1 | — | — | 15 | 150 | 34.9 | 14.2 | 20.8 |
| 9H4F | PAA 1 | — | — | 30 | 150 | 27.6 | 9.9 | — |
| 9H4F | PAA 1 | — | — | 10 | 150 | 39.4 | 17.0 | 20.1 |
| 9H4F | PAA 1 | — | — | 7.5 | 150 | 25.3 | 9.2 | — |
| 9H4F | PAA 1 | — | — | 5 | 150 | 76.0 | — | — |
| 9H4F | PAA 2 | — | — | 10 | 150 | 44.8 | — | — |
| 9H4F | PAA 2 | — | — | 7.5 | 150 | 72.1 | — | — |
| 9H4F | PAA 2 | — | — | 5 | 150 | 74.9 | — | — |
| 9H4F | PAA 3 | — | — | 10 | 150 | 58.0 | — | — |
| 9H4F | PAA 3 | — | — | 7.5 | 150 | 81.6 | — | — |
| 9H4F | PAA 3 | — | — | 5 | 150 | 79.9 | — | — |
| 9H4F | PAA 4 | — | — | 10 | 150 | 63.0 | — | — |
| 9H4F | PAA 4 | — | — | 7.5 | 150 | 74.3 | — | — |
| 9H4F | PAA 4 | — | — | 5 | 150 | 62.2 | — | — |
| 9H4F | PAA 5 | — | — | 10 | 150 | 65.4 | — | — |
| 9H4F | PAA 5 | — | — | 7.5 | 150 | 69.3 | — | — |
| 9H4F | PAA 5 | — | — | 5 | 150 | 48.9 | — | — |

Table 5 summarizes the absorbent properties of polymer networks prepared by reacting a commercially available carboxymethyl cellulose (AQUALON CMC 7H4F, Hercules Corp., Hopewell, Va.) and polyacrylamide (PAAm 2, molecular weight 11-14 million) (10 percent by weight based on the CMC) with 1,4-butanediol (XL-1) (percent by weight based on CMC), and recovering the polymer network by evaporation to a film.

TABLE 5

Absorbent Properties of Representative Polymer Networks: Carboxylmethyl Cellulose and Polyacrylamide with 1,4-Butanediol.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 7H4F | PAAm 2 | 0.5 | — | 60 | 150 | 31.6 | 20.8 | 14.2 |
| 7H4F | PAAm 2 | 1.0 | — | 60 | 150 | 35.9 | 24.7 | 11.9 |
| 7H4F | PAAm 2 | 2.0 | — | 60 | 150 | 35.7 | 26.2 | 12.9 |
| 7H4F | PAAm 2 | 4.0 | — | 60 | 150 | 33.7 | 23.8 | 12.3 |

Table 6 summarizes the absorbent properties of polymer networks prepared by reacting a commercially available carboxymethyl cellulose (AQUALON CMC 9H4F, Hercules Corp., Hopewell, Va.) and polyacrylamide (PAAm 2, molecular weight 11-14 million) (10 percent by weight based on the CMC) with glutaraldehyde (XL-2) (mole percent based on equivalent acrylamide monomer content of PAAm 2), and recovering the polymer network by precipitation in acetone.

TABLE 6

Absorbent Properties of Representative Polymer Networks:
Carboxylmethyl Cellulose and Polyacrylamide with Glutaraldehyde.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 9H4F | PAAm 2 | — | 6.0 | 0 | — | 21.6 | 6.1 | 17.7 |
| 9H4F | PAAm 2 | — | 6.0 | 15 | 150 | 15.7 | 2.4 | 15.6 |
| 9H4F | PAAm 2 | — | 6.0 | 30 | 150 | 14.7 | 2.2 | 12.2 |
| 9H4F | PAAm 2 | — | 8.0 | 0 | — | 56.7 | 37.2 | 19.8 |
| 9H4F | PAAm 2 | — | 8.0 | 15 | 150 | 25.1 | 4.7 | 21.3 |
| 9H4F | PAAm 2 | — | 8.0 | 30 | 150 | 24.9 | 3.6 | 13.6 |
| 9H4F | PAAm 2 | — | 10.0 | 0 | — | 53.9 | 34.0 | 22.0 |
| 9H4F | PAAm 2 | — | 10.0 | 15 | 150 | 22.2 | 4.8 | 18.5 |
| 9H4F | PAAm 2 | — | 10.0 | 30 | 150 | 18.3 | 3.0 | 19.1 |
| 9H4F | PAAm 2 | — | 6.0 | 0 | — | 29.0 | 18.4 | 27.6 |
| 9H4F | PAAm 2 | — | 6.0 | 15 | 150 | 87.9 | 4.3 | 36.9 |
| 9H4F | PAAm 2 | — | 6.0 | 30 | 150 | 69.3 | 44.6 | 33.3 |
| 9H4F | PAAm 2 | — | 8.0 | 0 | — | 35.3 | 21.7 | 18.9 |
| 9H4F | PAAm 2 | — | 8.0 | 15 | 150 | 72.5 | 48.4 | 30.9 |
| 9H4F | PAAm 2 | — | 8.0 | 30 | 150 | 55.8 | 27.6 | 34.0 |
| 9H4F | PAAm 2 | — | 10.0 | 0 | — | 28.9 | 19.3 | 24.8 |
| 9H4F | PAAm 2 | — | 10.0 | 15 | 150 | 77.5 | 54.2 | 35.8 |
| 9H4F | PAAm 2 | — | 10.0 | 30 | 150 | 61.1 | 35.4 | 33.7 |

Table 7 summarizes the absorbent properties of polymer networks prepared by reacting commercially available carboxymethyl celluloses (AQUALON CMC 7H4F or 9H4F, Hercules Corp., Hopewell, Va.) and polyacrylic acid (PAA 1, molecular weight 4 million) (10 percent by weight based on the CMC) with ethylene glycol diglycidyl ether (XL-1) (percent by weight based on CMC), and recovering the polymer network by precipitation in acetone.

TABLE 7

Absorbent Properties of Representative Polymer Networks: Carboxylmethyl Cellulose and Polyacrylic Acid with Ethylene Glycol Diglycidyl Ether.

| CMC | Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 9H4F | PAA 1 | 1.0 | — | 0 | — | 57.0 | 38.5 | 20.4 |
| 9H4F | PAA 1 | 1.0 | — | 10 | 150 | 24.0 | 10.9 | 17.8 |
| 9H4F | PAA 1 | 1.0 | — | 20 | 150 | 13.3 | 4.3 | 13.7 |
| 9H4F | PAA 1 | 1.0 | — | 30 | 150 | 11.5 | 3.3 | 11.7 |
| 9H4F | PAA 1 | 2.0 | — | 0 | — | 63.2 | 41.9 | 17.3 |
| 9H4F | PAA 1 | 2.0 | — | 10 | 150 | 24.9 | 9.2 | 15.9 |
| 9H4F | PAA 1 | 2.0 | — | 20 | 150 | 16.8 | 5.8 | 14.2 |
| 9H4F | PAA 1 | 2.0 | — | 30 | 150 | 12.7 | 3.9 | 15.6 |
| 7H4F | PAA 1 | 1.0 | — | 0 | — | 49.1 | 32.9 | 17.5 |
| 7H4F | PAA 1 | 1.0 | — | 10 | 150 | 12.3 | 4.6 | 12.0 |
| 7H4F | PAA 1 | 1.0 | — | 20 | 150 | 9.7 | 3.1 | 9.3 |
| 7H4F | PAA 1 | 1.0 | — | 30 | 150 | 9.6 | 2.7 | 11.2 |
| 7H4F | PAA 1 | 2.0 | — | 0 | — | 25.7 | 14.4 | 15.0 |
| 7H4F | PAA 1 | 2.0 | — | 10 | 150 | 14.4 | 4.8 | 10.6 |
| 7H4F | PAA 1 | 2.0 | — | 20 | 150 | 10.2 | 3.1 | 8.6 |
| 7H4F | PAA 1 | 2.0 | — | 30 | 150 | 10.2 | 2.7 | 12.4 |

Table 8 summarizes the absorbent properties of polymer networks prepared by reacting a commercially available carboxymethyl cellulose (AQUALON CMC 9H4F, Hercules Corp., Hopewell, Va.) and polyacrylamide (PAAm 2, molecular weight 11-14 million) (10 percent by weight based on the CMC) with formaldehyde (F), glyoxal (GLY), and glutaraldehyde (GLU) (XL-2) (8 mole percent based on the equivalent acrylamide monomer content of PAAm 1), and recovering the polymer network by precipitation in acetone.

TABLE 8

Absorbent Properties of Representative Polymer Networks: Carboxylmethyl Cellulose and Polyacrylamide with Aldehydes.

| CMC | Synthetic Polymer | XL-1 (wt %) | XL-2 | t (min) | T (° C.) | Free Swell (g/g) | Centrifuge (g/g) | AUL (g/g) |
|---|---|---|---|---|---|---|---|---|
| 9H4F | PAAm 2 | — | F | 0 | — | 32.8 | 23.9 | — |
| 9H4F | PAAm 2 | — | F | 15 | 150 | 73.8 | 50.0 | 23.5 |
| 9H4F | PAAm 2 | — | F | 30 | 150 | 37.9 | 15.6 | 21.4 |
| 9H4F | PAAm 2 | — | F | 60 | 150 | 43.0 | 17.4 | 20.1 |
| 9H4F | PAAm 2 | — | GLY | 0 | — | 43.1 | 30.0 | 24.4 |
| 9H4F | PAAm 2 | — | GLY | 15 | 150 | 64.4 | 40.2 | 23.8 |
| 9H4F | PAAm 2 | — | GLY | 30 | 150 | 47.8 | 25.3 | 24.6 |
| 9H4F | PAAm 2 | — | GLY | 60 | 150 | 37.7 | 16.2 | 20.5 |
| 9H4F | PAAm 2 | — | GLU | 0 | — | 86.2 | 42.0 | 15.2 |
| 9H4F | PAAm 2 | — | GLU | 15 | 150 | 67.8 | 42.1 | 26.4 |
| 9H4F | PAAm 2 | — | GLU | 30 | 150 | 52.8 | 25.5 | 24.6 |
| 9H4F | PAAm 2 | — | GLU | 60 | 150 | 41.6 | 17.2 | 24.6 |

Table 9 summarizes the absorbent properties of polymer networks prepared by reacting a commercially available carboxymethyl cellulose (AQUALON CMC 9H4F, Hercules Corp., Hopewell, Va.) and polyacrylamide (PAAm 2, molecular weight 11-14 million) (10 percent by weight based on the CMC) with divinyl sulfone (DVS), triethanol amine (TEA), ethylene glycol digycidyl ether (EGDE), polyoxazoline functionalized polymer WS 500 (WS), and a polyamine JEFFAMINE D-400 (JF), and recovering the polymer network by precipitation in acetone.

TABLE 9

Absorbent Properties of Representative Polymer Networks: Carboxylmethyl Cellulose and Polyacrylamide with Various Crosslinking Agents.

| CMC | Synthetic Polymer | XL-1 (wt %) | XL-2 | t (min) | T (° C.) | Free Swell (g/g) | Centrifuge (g/g) | AUL (g/g) |
|---|---|---|---|---|---|---|---|---|
| 9H4F | PAAm 2 | | DVS (2) | 0 | — | 60.1 | 39.9 | 28.8 |
| 9H4F | PAAm 2 | | DVS (2) | 15 | 150 | 53.0 | 27.9 | 23.9 |
| 9H4F | PAAm 2 | | TEA (2) | 0 | — | 22.4 | 6.7 | 13.7 |
| 9H4F | PAAm 2 | | TEA (2) | 10 | 150 | 17.3 | 3.2 | 15.8 |
| 9H4F | PAAm 2 | | TEA (1) | 0 | — | 60.0 | 41.2 | 22.3 |
| 9H4F | PAAm 2 | | TEA (1) | 10 | 130 | 28.5 | 8.0 | 19.4 |

TABLE 9-continued

Absorbent Properties of Representative Polymer Networks:
Carboxylmethyl Cellulose and Polyacrylamide with Various Crosslinking Agents.

| CMC | Synthetic Polymer | XL-1 (wt %) | XL-2 | t (min) | T (° C.) | Free Swell (g/g) | Centrifuge (g/g) | AUL (g/g) |
|---|---|---|---|---|---|---|---|---|
| 9H4F | PAAm 2 | EDGE (3) | — | 0 | — | 31.8 | 12.3 | 24.2 |
| 9H4F | PAAm 2 | EDGE (3) | — | 15 | 150 | 18.4 | 3.1 | 15.3 |
| 9H4F | PAAm 2 | EDGE (3) | — | 30 | 150 | 18.3 | 2.7 | 11.9 |
| 9H4F | PAAm 2 | EDGE (2) | — | 0 | — | 38.3 | 15.7 | 25.5 |
| 9H4F | PAAm 2 | EDGE (2) | — | 15 | 150 | 32.7 | 9.3 | 26.9 |
| 9H4F | PAAm 2 | WS (2) | — | 0 | — | 33.7 | 14.6 | 20.2 |
| 9H4F | PAAm 2 | WS (2) | — | 15 | 150 | 25.3 | 6.7 | 18.2 |
| 9H4F | PAAm 2 | WS (2) | — | 30 | 150 | 22.9 | 5.4 | 19.5 |
| 9H4F | PAAm 2 | WS (1) | — | 0 | — | 44.4 | 23.2 | 23.1 |
| 9H4F | PAAm 2 | WS (1) | — | 15 | 150 | 31.2 | 9.9 | 24.6 |
| 9H4F | PAAm 2 | WS (1) | — | 30 | 150 | 24.7 | 6.1 | 18.4 |
| 9H4F | PAAm 2 | JF (2) | — | 0 | — | 33.2 | 21.0 | 22.8 |
| 9H4F | PAAm 2 | JF (2) | — | 15 | 150 | 26.7 | 6.8 | 20.2 |
| 9H4F | PAAm 2 | JF (2) | — | 30 | 150 | 21.2 | 4.4 | 19.3 |

Table 10 summarizes the absorbent properties of polymer networks prepared by reacting a commercially available carboxymethyl cellulose (AQUALON CMC 7H4F, Hercules Corp., Hopewell, Va.) and polyacrylamide (PAAm 2, molecular weight 11-14 million) (10 percent by weight based on the CMC) with 1,4-butanediol (XL-1) (percent by weight based on CMC) and formaldehyde (XL-2) (mole percent based on the equivalent acrylamide monomer content of PAAm 2), and recovering the polymer network by evaporation to a film.

TABLE 10

Absorbent Properties of Representative Polymer Networks: Carboxylmethyl Cellulose and Polyacrylamide with 1,4-Butanediol and Formaldehyde.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 7H4F | PAAm 2 | 0.5 | 2.0 | 60 | 150 | 28.4 | 19.7 | 12.0 |
| 7H4F | PAAm 2 | 1.0 | 2.0 | 60 | 150 | 27.2 | 16.6 | 14.4 |
| 7H4F | PAAm 2 | 2.0 | 2.0 | 60 | 150 | 27.8 | 18.3 | 12.8 |
| 7H4F | PAAm 2 | 4.0 | 2.0 | 60 | 150 | 33.7 | 22.9 | 12.9 |
| 7H4F | PAAm 2 | 0.5 | 4.0 | 60 | 150 | 22.2 | 12.2 | 12.1 |
| 7H4F | PAAm 2 | 1.0 | 4.0 | 60 | 150 | 21.2 | 13.5 | 11.3 |
| 7H4F | PAAm 2 | 2.0 | 4.0 | 60 | 150 | 18.8 | 11.0 | 11.4 |
| 7H4F | PAAm 2 | 4.0 | 4.0 | 60 | 150 | 15.8 | 9.1 | 11.5 |
| 7H4F | PAAm 2 | 0.5 | 8.0 | 60 | 150 | 27.2 | 16.6 | 14.1 |
| 7H4F | PAAm 2 | 1.0 | 8.0 | 60 | 150 | 27.0 | 17.5 | 13.5 |
| 7H4F | PAAm 2 | 2.0 | 8.0 | 60 | 150 | 32.1 | 22.7 | 12.1 |
| 7H4F | PAAm 2 | 4.0 | 8.0 | 60 | 150 | 30.4 | 21.0 | 11.4 |
| 7H4F | PAAm 2 | 0.5 | 16.0 | 60 | 150 | 16.6 | 9.9 | 9.8 |
| 7H4F | PAAm 2 | 1.0 | 16.0 | 60 | 150 | 19.0 | 11.3 | 10.4 |
| 7H4F | PAAm 2 | 2.0 | 16.0 | 60 | 150 | 18.9 | 10.7 | 11.1 |
| 7H4F | PAAm 2 | 4.0 | 16.0 | 60 | 150 | 16.6 | 8.8 | 9.8 |

Table 11 summarizes the absorbent properties of polymer networks prepared by reacting a commercially available carboxymethyl cellulose (AQUALON CMC 9H4F, Hercules Corp., Hopewell, Va.) and polyacrylamide (PAAm 2, molecular weight 11-14 million) (10 percent by weight based on the CMC) with ethylene glycol diglycidyl ether (XL-1) (percent by weight based on CMC) and formaldehyde (XL-2) (mole percent based on the equivalent acrylamide monomer content of PAAm 2), and recovering the polymer network by precipitation in acetone.

TABLE 11

Absorbent Properties of Representative Polymer Networks: Carboxylmethyl Cellulose and Polyacrylamide with Ethylene Glycol Diglycidyl Ether and Formaldehyde.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 9H4F | PAAm 2 | 1.0 | 8.0 | 0 | — | 63.7 | 50.2 | 17.3 |
| 9H4F | PAAm 2 | 1.0 | 8.0 | 15 | 150 | 63.0 | 37.3 | 21.8 |
| 9H4F | PAAm 2 | 1.0 | 8.0 | 30 | 150 | 47.8 | 22.4 | 22.8 |
| 9H4F | PAAm 2 | 1.0 | 8.0 | 60 | 150 | 38.6 | 14.1 | 20.7 |
| 9H4F | PAAm 2 | 2.0 | 8.0 | 0 | — | 48.6 | 31.4 | 22.5 |
| 9H4F | PAAm 2 | 2.0 | 8.0 | 15 | 150 | 47.2 | 23.6 | 22.8 |
| 9H4F | PAAm 2 | 2.0 | 8.0 | 30 | 150 | 51.4 | 26.3 | 25.7 |
| 9H4F | PAAm 2 | 2.0 | 8.0 | 60 | 150 | 27.4 | 10.4 | 19.3 |

Table 12 summarizes the absorbent properties of polymer networks prepared by reacting a commercially available carboxymethyl cellulose (AQUALON CMC 9H4F, Hercules Corp., Hopewell, Va.) and polyacrylamide (PAAm 2, molecular weight 11-14 million) (10 percent by weight based on the CMC) with ethylene glycol diglycidyl ether (XL-1) (percent by weight based on CMC) and glutaraldehyde (XL-2) (mole percent based on the equivalent acrylamide monomer content of PAAm 2), and recovering the polymer network by precipitation in acetone.

TABLE 12

Absorbent Properties of Representative Polymer Networks: Carboxylmethyl Cellulose and Polyacrylamide with Ethylene Glycol Diglycidyl Ether and Glutaraldehyde.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 9H4F | PAAm 2 | 2.0 | 6.0 | 0 | — | 65.2 | 42.2 | 22.4 |
| 9H4F | PAAm 2 | 2.0 | 6.0 | 15 | 150 | 67.7 | 39.7 | 28.2 |
| 9H4F | PAAm 2 | 2.0 | 8.0 | 0 | — | 53.9 | 31.5 | 29.7 |
| 9H4F | PAAm 2 | 2.0 | 8.0 | 15 | 150 | 57.5 | 27.5 | 34.1 |

Table 13 summarizes the absorbent properties of polymer networks prepared by reacting a commercially available carboxymethyl cellulose (AQUALON CMC 9H4F, Hercules Corp., Hopewell, Va.) and polyacrylamide (PAAm 2, molecular weight 11-14 million) (10 percent by weight based on the CMC) with triethanolamine (XL-1) (percent by weight based on CMC) and formaldehyde (XL-2) (mole percent based on the equivalent acrylamide monomer content of PAAm 2), and recovering the polymer network by precipitation in acetone.

TABLE 13

Absorbent Properties of Representative Polymer Networks: Carboxylmethyl Cellulose and Polyacrylamide with Triethanolamine and Formaldehyde.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 9H4F | PAAm 2 | 1.0 | 8.0 | 0 | — | 58.6 | 40.6 | 18.9 |
| 9H4F | PAAm 2 | 1.0 | 8.0 | 15 | 150 | 18.2 | 3.4 | 9.9 |
| 9H4F | PAAm 2 | 1.0 | 8.0 | 30 | 150 | 16.4 | 2.8 | 10.9 |
| 9H4F | PAAm 2 | 1.0 | 8.0 | 60 | 150 | 17.0 | 2.5 | 11.5 |
| 9H4F | PAAm 2 | 2.0 | 8.0 | 0 | — | 71.7 | 53.3 | 13.4 |
| 9H4F | PAAm 2 | 2.0 | 8.0 | 15 | 150 | 19.3 | 3.6 | 12.9 |
| 9H4F | PAAm 2 | 2.0 | 8.0 | 30 | 150 | 18.3 | 3.0 | 12.2 |
| 9H4F | PAAm 2 | 2.0 | 8.0 | 60 | 150 | 18.5 | 2.9 | 13.3 |

Table 14 summarizes the absorbent properties of polymer networks prepared by reacting a commercially available carboxymethyl cellulose (AQUALON CMC 9H4F, Hercules Corp., Hopewell, Va.) and polyacrylamide (PAAm 2, molecular weight 11-14 million) (10 percent by weight based on the CMC) with triethanolamine (XL-1) (percent by weight based on CMC) and glutaraldehyde (XL-2) (mole percent based on the equivalent acrylamide monomer content of PAAm 2), and recovering the polymer network by precipitation in acetone.

TABLE 14

Absorbent Properties of Representative Polymer Networks: Carboxylmethyl Cellulose and Polyacrylamide with Triethanolamine and Glutaraldehyde.

| CMC | Synthetic Polymer | XL-1 (wt %) | XL-2 (mol %) | t (min) | T (° C.) | Free Swell (g/g) | Centrifuge (g/g) | AUL (g/g) |
|---|---|---|---|---|---|---|---|---|
| 9H4F | PAAm 2 | 0.5 | 6.0 | 0 | — | 25.5 | 16.4 | 26.8 |
| 9H4F | PAAm 2 | 0.5 | 6.0 | 10 | 100 | 26.1 | 15.9 | 37.3 |
| 9H4F | PAAm 2 | 0.5 | 6.0 | 20 | 150 | 31.4 | 20.8 | 25.0 |
| 9H4F | PAAm 2 | 0.5 | 8.0 | 0 | — | 30.6 | 19.4 | 24.2 |
| 9H4F | PAAm 2 | 0.5 | 8.0 | 10 | 100 | 33.0 | 22.0 | 21.0 |
| 9H4F | PAAm 2 | 0.5 | 8.0 | 20 | 150 | 46.3 | 33.1 | 22.9 |

In another aspect, the invention provides absorbent products that include the polymer network described above. The polymer network can be incorporated into a personal care absorbent product. The polymer network can be included in a composite for incorporation into a personal care absorbent product. Composites can be formed to include the polymer network alone or by combining the polymer network with other materials, including fibrous materials, binder materials, other absorbent materials, and other materials commonly employed in personal care absorbent products. Suitable fibrous materials include synthetic fibers, such as polyester, polypropylene, and bicomponent binding fibers; and cellulosic fibers, such as fluff pulp fibers, crosslinked cellulosic fibers, cotton fibers, and CTMP fibers. Suitable other absorbent materials include natural absorbents, such as sphagnum moss, and conventional synthetic superabsorbents, such as polyacrylates.

Absorbent composites derived from or that include the polymer network of the invention can be advantageously incorporated into a variety of absorbent articles such as diapers including disposable diapers and training pants; feminine care products including sanitary napkins, and pant liners; adult incontinence products; toweling; surgical and dental sponges; bandages; food tray pads; and the like. Thus, in another aspect, the present invention provides absorbent composites, constructs, and absorbent articles that include the polymer network.

The polymer network can be incorporated as an absorbent core or storage layer into a personal care absorbent product such as a diaper. The composite can be used alone or combined with one or more other layers, such as acquisition and/or distribution layers, to provide useful absorbent constructs.

Figure 2:
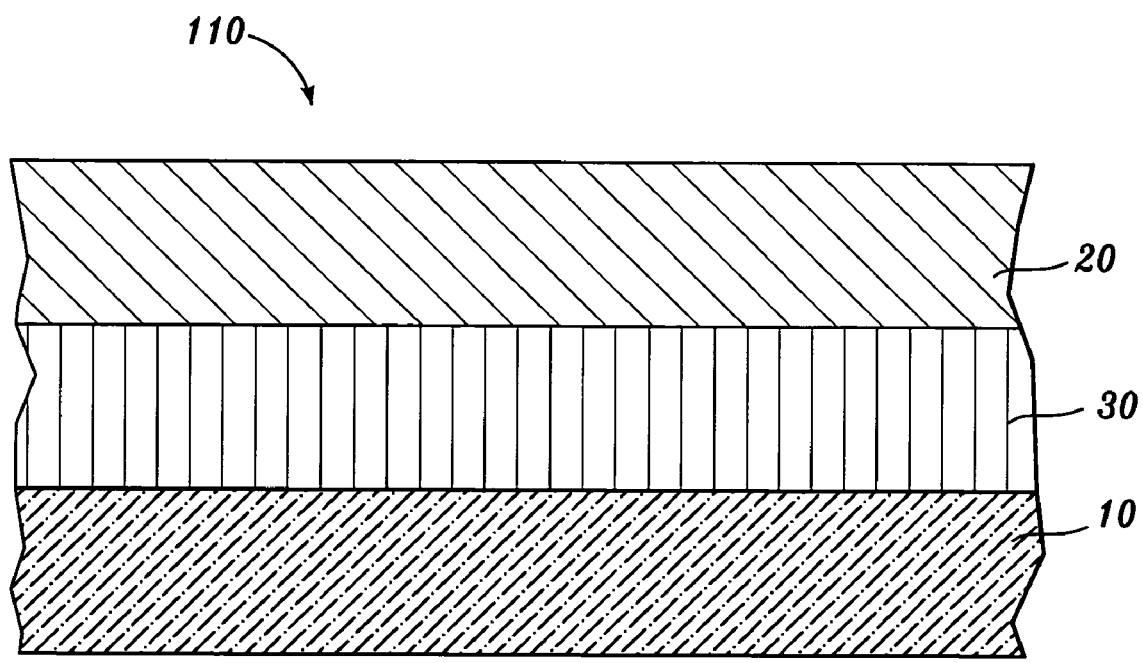
FIG. 2 is a cross sectional view of an absorbent construct incorporating a polymer network of the invention and having acquisition and distribution layers.

Representative absorbent constructs incorporating an absorbent composite that includes the polymer network of the invention are shown in FIGS. 1 and 2. Referring to FIG. 1, construct 100 includes composite 10 (i.e., a composite that includes the polymer network) employed as a storage layer in combination with an upper acquisition layer 20.

In addition to the construct noted above that includes the combination of absorbent composite and acquisition layer, further constructs can include a distribution layer intermediate the acquisition layer and composite. FIG. 2 illustrates construct 110 having intermediate layer 30 (e.g., distribution layer) interposed between acquisition layer 20 and composite 10.

Figure 3A:
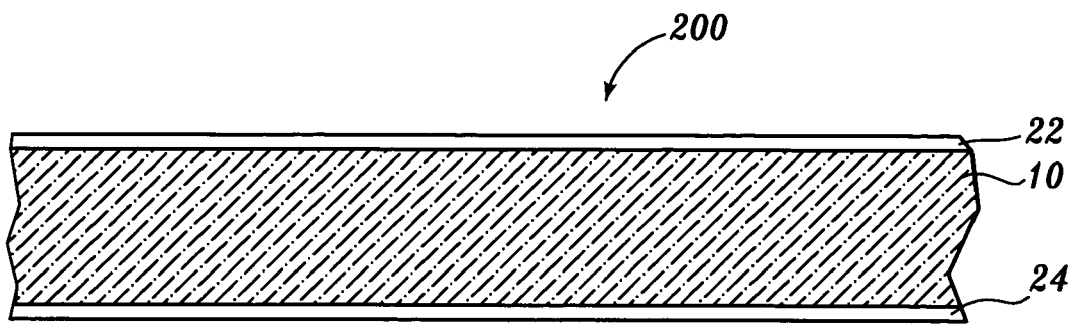
FIGS. 3A-C are cross sectional views of absorbent articles incorporating a composite including a polymer network of the invention and the absorbent constructs illustrated in FIGS. 1 and 2, respectively.
Figure 3B:
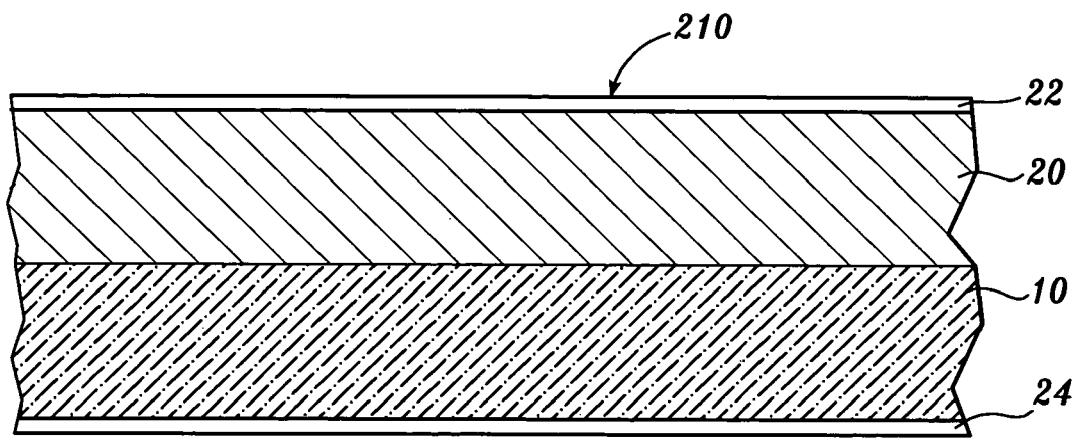
Figure 3C:
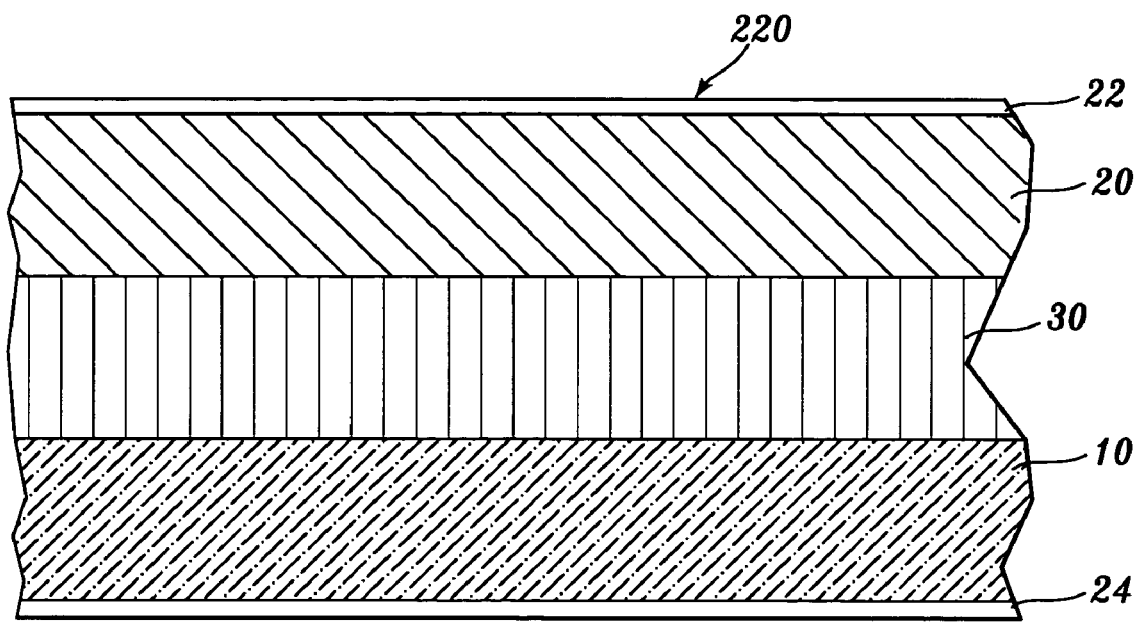

Composite 10 and constructs 100 and 110 can be incorporated into absorbent articles. Generally, absorbent articles 200, 210, and 220 shown in FIGS. 3A-C, include liquid pervious facing sheet 22, liquid impervious backing sheet 24, and a composite 10, construct 100, or construct 110, respectively. In such absorbent articles, the facing sheet can be joined to the backing sheet.

It will be appreciated that other absorbent products can be designed incorporating the superabsorbent composition and composites that include these compositions.

The following examples are provided for the purpose of illustrating, not limiting, the present invention.

EXAMPLES

Example 1

Method for Making Carboxymethyl Cellulose

In this example, a method for making a carboxymethyl cellulose of the invention is described.

General Method. A slurry of pulp in isopropanol was cooled in an ice bath under nitrogen. The resulting slurry was mercerized by treatment with aqueous sodium hydroxide and then etherified by the addition of chloroacetic acid in isopropanol. The time and temperature for mercerization and etherification can be varied depending on the desired carboxymethyl cellulose properties. The carboxymethyl cellulose was collected by filtration and neutralized by adjusting the pH to about 6-7. The product was then washed with alcohol (e.g., two washes with 70% ethanol; two washes with 80% ethanol; two washes with 90% ethanol; one wash with 100% methanol) and dried.

A 1 percent by weight solution of the carboxymethyl cellulose in water can be then tested for viscosity and degree of carboxy substitution (by titration or high performance liquid chromatography methods).

Further chemistry can be carried out with the carboxymethyl cellulose solutions. The carboxymethyl cellulose can be crosslinked by treating with a crosslinking agent (see above description for suitable crosslinking agents). Alternatively, the carboxymethyl cellulose can be combined with a synthetic water-soluble polymer (e.g., polyacrylic acid, polyacrylamide) and a crosslinking agent to provide a polymer network. In either method, the carboxymethyl cellulose solution containing crosslinking agent or synthetic water-soluble polymer and crosslinking agent can be air dried or solvent precipitated followed by crosslinking. Crosslinking time and temperature will depend on the crosslinking agent and polymers used.

Representative Method. Lightly bleached never dried kraft pulp (25.0 g, oven dried) was mixed with isopropanol (1.39 L) under nitrogen environment at 0° C. for 30 min. A sodium hydroxide solution (20.28 g in water with a total weight of 135.3 g) was added dropwise over 30 minutes and the reaction was left to stir for 1 h. A solution of monochloroacetic acid (22.69 g) in isopropanol (55.55 mL) was added dropwise to the stirring pulp over 30 min while the reaction temperature was increased to 55° C. The reaction was stirred for 3 h and then filtered, placed in 2 L 70/30 methanol/water solution, neutralized with acetic acid. The resulting slurry was collected by filtration, washed one time each with 2 L 70/30, 80/20, and 90/10 ethanol/water solutions, and then finally with 100% methanol to provide the product carboxymethyl cellulose.

Example 2

Representative Method for Making a Polymer Network

In this example, a representative procedure for making a polymer network composition of the invention is described.

A carboxyalkyl cellulose, synthetic water-soluble polymer, and crosslinking agent (optional catalyst) were combined in water and stirred until homogeneous (about 2 to 24 hours). The reaction mixture was then poured into about 3-4 volumes of a water-miscible non-solvent (e.g., acetone, ethanol, or isopropanol) and allowed to stand for from about 30 minutes to 24 hours). The precipitated mixture was isolated and then soaked in one volume of a water-miscible non-solvent (e.g., acetone, ethanol, or isopropanol) and allowed to stand for from about 30 minutes to 24 hours). The precipitated mixture was isolated and air-dried (about 2 to 24 hours). The air-dried mixture was then comminuted (e.g., using a blender or coffee grinder) (particle size from about 300 μm to about 850 μm) and then heated, if necessary, to effect crosslinking and network formation. Heating conditions were varied (e.g., from about 50° C. to 200° C. for 0 to 120 minutes).

Alternatively, a carboxyalkyl cellulose and synthetic water-soluble polymer were combined in water and stirred until homogeneous (about 2 to 24 hours) to provide a polymer solution. A crosslinking agent (e.g., glutaraldehyde) dissolved in water was then added to the polymer solution to provide a reaction mixture, which was then evaporated to dryness in a shallow pan to form a film. The film was then comminuted and handled as described above.

The polymer networks produced by the method were then tested for absorbency properties.

Example 3

Representative Method for Making a Fibrous Polymer Network

In this example, a representative procedure for making a fibrous polymer network composition of the invention is described.

The polymer network is made from blend of a carboxymethyl cellulose and a polyacrylamide that is surface crosslinked. The method for making the composition is applicable to a fiber spinning process in which the coagulation bath is isopropanol (or methanol, ethanol, or acetone) containing dissolved crosslinking agent (e.g., aluminum chloride hexahydrate or other crosslinking agent soluble in the water-miscible solvent of the bath).

A polymer blend solution including 1.8 percent by weight carboxymethyl cellulose (Hercules 9H4F) and 0.2 percent by weight polyacrylamide (molecular weight 5-6 million obtained from Polysciences Inc.) in water was prepared and allowed to stand for 3 days. A precipitation/coagulation bath was prepared by dissolving aluminum chloride hexahydrate in isopropanol (0.1% w/w) and placing the solution in a shallow pan. The polymer solution was extruded into the bath using a syringe, creating long strands of liquid polymer solution which rapidly surface coagulated, forming fibers. After 30 minutes the fibers were removed and placed in fresh isopropanol overnight. The fibers were then removed from the isopropanol and air-dried.

For absorbency testing, the air-dried fibers were comminuted in a coffee grinder creating particles 20-50 mesh screen size. The particles had a Free Swell Capacity of 49.48 g/g; a Centrifuge Capacity of 34.11 g/g; and an AUL of 13.84 g/g.

Example 4

Method for Determining Free Swell Capacity and Centrifuge Capacity

In this example, a method for determining free swell capacity (g/g) and centrifuge capacity (g/g) is described.

The materials, procedure, and calculations to determine free swell capacity (g/g) and centrifuge capacity (g/g) were as follows.

Test Materials:

Japanese pre-made empty tea bags (available from Drugstore.com, IN PURSUIT OF TEA polyester tea bags 93 mm×70 mm with fold-over flap. (http:www.mesh.nejp/tokiwa/).

Balance (4 decimal place accuracy, 0.0001 g for air-dried superabsorbent polymer (AD SAP) and tea bag weights).

Timer.

1% Saline.

Drip rack with clips (NLM 211)

Lab centrifuge (NLM 211, Spin-X spin extractor, model 776S, 3,300 RPM, 120v).

Test Procedure:

1. Determine solids content of AD SAP.

2. Pre-weigh tea bags to nearest 0.0001 g and record.

3. Accurately weigh 0.2025 g+/−0.0025 g of test material (SAP), record and place into pre-weighed tea bag (air-dried (AD) bag weight). (AD SAP weight+AD bag weight=total dry weight).

4. Fold tea bag edge over closing bag.

5. Fill a container (at least 3 inches deep) with at least 2 inches with 1% saline.

6. Hold tea bag (with test sample) flat and shake to distribute test material evenly through bag.

7. Lay tea bag onto surface of saline and start timer.

8. Soak bags for specified time (e.g., 30 minutes).

9. Remove tea bags carefully, being careful not to spill any contents from bags, hang from a clip on drip rack for 3 minutes.

10. Carefully remove each bag, weigh, and record (drip weight).

11. Place tea bags onto centrifuge walls, being careful not to let them touch and careful to balance evenly around wall.

12. Lock down lid and start timer. Spin for 75 seconds.

13. Unlock lid and remove bags. Weigh each bag and record weight (centrifuge weight).

Calculations:

The tea bag material has an absorbency determined as follows:

Free Swell Capacity, factor=5.78
Centrifuge Capacity, factor=0.50
Free Capacity (g/g):

$$\frac{[\text{drip } wt \text{ (g)} - \text{dry bag } wt \text{ (g)} - (AD\ SAP\ wt\ (g))] - [\text{dry bag } wt \text{ (g)} * 5.78]}{[AD\ SAP\ wt\ (g) * Z]}$$

Centrifuge Capacity (g/g):

$$\frac{[\text{centrifuge } wt \text{ (g)} - \text{dry bag } wt \text{ (g)} - (AD\ SAP\ wt\ (g))] - [\text{dry bag } wt \text{ (g)} * 0.50]}{[AD\ SAP\ wt\ (g) * Z]}$$

Z=Oven dry SAP (g)/Air dry SAP (g)

Example 5

Method for Determining Absorbency Under Load (AUL)

In this example, a method for determining Absorbency Under Load (AUL) is described.

Figure 4:
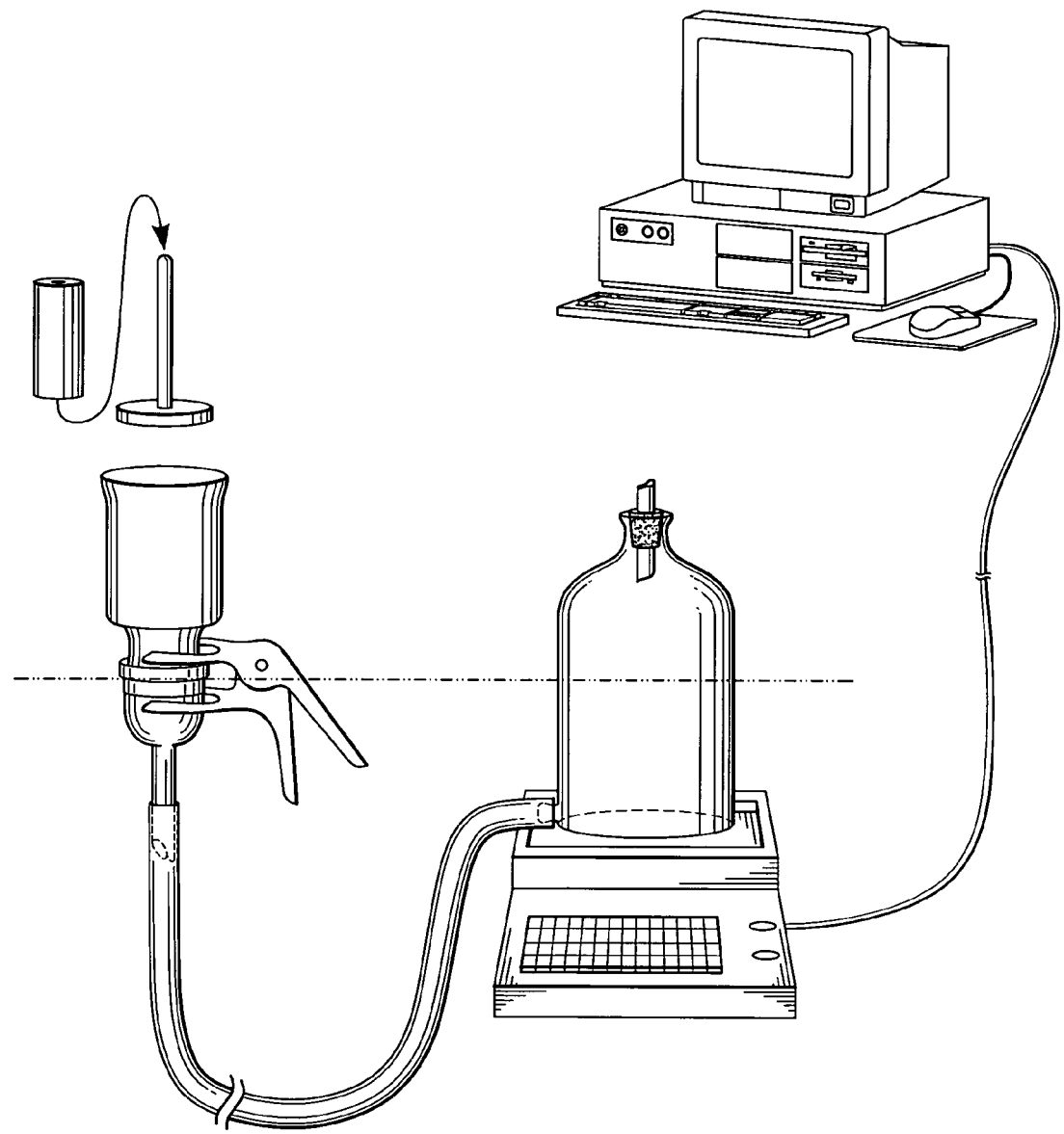
FIG. 4 is a schematic illustration of a device for measuring Absorbency Under Load (AUL) values.

The materials, procedure, and calculations to determine AUL were as follows. Reference is made to FIG. 4.

Test Materials:

Mettler Toledo PB 3002 balance and BALANCE-LINK software or other compatible balance and software. Software set-up: record weight from balance every 30 sec (this will be a negative number. Software can place each value into EXCEL spreadsheet.

Kontes 90 mm ULTRA-WARE filter set up with fritted glass (coarse) filter plate clamped to stand.

2 L glass bottle with outlet tube near bottom of bottle.

Rubber stopper with glass tube through the stopper that fits the bottle (air inlet).

TYGON tubing.

Stainless steel rod/plexiglass plunger assembly (71 mm diameter).

Stainless steel weight with hole drill through to place over plunger (plunger and weight=867 g)

VWR 9.0 cm filter papers (Qualitative 413 catalog number 28310-048) cut down to 80 mm size.

Double-stick SCOTCH tape.

0.9% Saline.

Test Procedure:

1. Level filter set-up with small level.

2. Adjust filter height or fluid level in bottle so that fritted glass filter and saline level in bottle are at same height.

3. Make sure that there are no kinks in tubing or air bubbles in tubing or under fritted glass filter plate.

4. Place filter paper into filter and place stainless steel weight onto filter paper.

5. Wait for 5-10 min while filter paper becomes fully wetted and reaches equilibrium with applied weight.

6. Zero balance.

7. While waiting for filter paper to reach equilibrium prepare plunger with double stick tape on bottom.

8. Place plunger (with tape) onto separate scale and zero scale.

9. Place plunger into dry test material so that a monolayer of material is stuck to the bottom by the double stick tape.

10. Weigh the plunger and test material on zeroed scale and record weight of dry test material (dry material weight 0.15 g+/−0.05 g).

11. Filter paper should be at equilibrium by now, zero scale.

12. Start balance recording software.

13. Remove weight and place plunger and test material into filter assembly.

14. Place weight onto plunger assembly.

15. Wait for test to complete (30 or 60 min)

16. Stop balance recording software.

Calculations:

$A$=balance reading (g)*−1 (weight of saline absorbed by test material)

$B$=dry weight of test material (this can be corrected for moisture by multiplying the AD weight by solids %).

$AUL(g/g)=A/B$ (g 1% saline/1 g test material)

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A composition, obtained by reacting a carboxyalkyl cellulose, a carboxyalkyl lignin and a synthetic water-soluble polymer with a crosslinking agent, wherein the water-soluble polymer comprises a polymer having carboxylic acid or carboxylic acid derivative substituents, wherein the crosslinking agent reacts with at least one of the carboxyalkyl cellulose or water-soluble polymer.

2. The composition of claim 1, wherein the ratio of carboxyalkyl cellulose to water-soluble polymer is from about 50:50 to about 95:5 weight/weight.

3. The composition of claim 1, wherein the carboxyalkyl cellulose is selected from the group consisting of carboxymethyl cellulose and carboxyethyl cellulose.

4. The composition of claim 1, wherein the carboxyalkyl cellulose is derived from an unbleached or lightly bleached cellulose.

5. The composition of claim 4, wherein the unbleached or lightly bleached cellulose has a kappa value of from about 1 to about 65.

6. The composition of claim 1, wherein the water-soluble polymer having carboxylic acid substituents is selected from the group consisting of a polyacrylic acid, a polymaleic acid, a polyaspartic acid, a copolymer of acrylic acid and acrylamide, a copolymer of acrylic acid and maleic acid, a copolymer of maleic acid and itaconic acid, and mixtures thereof.

7. The composition of claim 1, wherein the polymer having carboxylic acid derivative substituents is a polyacrylamide.

8. The composition of claim 1, wherein the crosslinking agent is selected from the group consisting of a diol, a diamine, an aminol, and mixtures thereof.

9. The composition of claim 1, wherein the crosslinking agent is selected from the group consisting of an aldehyde, a dialdehyde, a dialdehyde sodium bisulfite addition product, a dihalide, a diene, a diepoxide, a haloepoxide, a dicarboxylic acid, a polycarboxylic acid, a polyoxazoline functionalized polymer, a polyvalent cation, a polycationic polymer, and mixtures thereof.

10. The composition of claim 1, wherein the water-soluble polymer is selected from the group consisting of polyacrylic acid, polyacrylamide, and mixtures thereof.

11. The composition of claim 1 having a Free Swell Capacity of at least about 45 g/g.

12. The composition of claim 1 having a Centrifuge Capacity of at least about 10 g/g.

13. The composition of claim 1 having an Absorbency Under Load value of at least about 20 g/g.

14. A composition obtained by a method comprising:
(a) treating a carboxyalkyl cellulose, a carboxyalkyl lignin and a synthetic water-soluble polymer with a crosslinking agent to provide a reaction mixture, wherein the crosslinking agent reacts with at least one of the carboxyalkyl cellulose or water-soluble polymer and wherein the water-soluble polymer comprises a polymer having carboxylic acid or carboxylic acid derivative substituents; and
(b) crosslinking the reaction mixture to provide the composition.

15. The composition of claim 14, wherein the ratio of carboxyalkyl cellulose to water-soluble polymer is from about 50:50 to about 95:5 weight/weight.

16. The composition of claim 14, wherein the carboxyalkyl cellulose is selected from the group consisting of carboxymethyl cellulose and carboxyethyl cellulose.

17. The composition of claim 14, wherein the synthetic water-soluble polymer is selected from the group consisting of a polyacrylamide, a polyacrylic acid, a polymaleic acid, a polyaspartic acid, a copolymer of acrylic acid and acrylamide, a copolymer of acrylic acid and maleic acid, a copolymer of maleic acid and itaconic acid, and mixtures thereof.

18. The composition of claim 14, wherein the crosslinking agent is selected from the group consisting of a diol, a diamine, an aminol, an aldehyde, a dialdehyde, a dialdehyde sodium bisulfite addition product, a dihalide, a diene, a diepoxide, a haloepoxide, a dicarboxylic acid, a polycarboxylic acid, a polyoxazoline functionalized polymer, a polyvalent cation, a polycationic polymer, and mixtures thereof.

19. A composition, obtained by the reaction of a carboxyalkyl cellulose, a carboxyalkyl lignin and a synthetic water-soluble polymer having carboxylic acid or carboxylic acid derivative substituents with two crosslinking agents, wherein each crosslinking agent reacts with at least one of the carboxyalkyl cellulose or water-soluble polymer.

* * * * *